United States Statutory Invention Registration [19]

[11] Reg. Number: H305

Mitchell et al. [43] Published: Jul. 7, 1987

[54] DEMILITARIZATION OF HIGH BURN RATE PROPELLANTS CONTAINING FERROCENE OR ITS DERIVATIVES

[75] Inventors: Porter H. Mitchell, Fayetteville, Tenn.; William S. Melvin, Huntsville, Ala.

[73] Assignee: The United States of America as represented by the Secretary of the Army, Washington, D.C.

[21] Appl. No.: 928,778

[22] Filed: Nov. 6, 1986

[51] Int. Cl.[4] ..... B01D 46/00

[52] U.S. Cl. ..... 556/143; 556/145; 102/291; 55/68

[56] References Cited

PUBLICATIONS

"J & W High Pressure Soxhlet Extractor", Feb. 2, 1984.
"Supercritical Extraction" by Air Products and Chemicals, Inc.

*Primary Examiner*—John F. Terapane
*Assistant Examiner*—Eric Jorgensen
*Attorney, Agent, or Firm*—John C. Garvin, Jr.; Freddie M. Bush

[57] ABSTRACT

An effective method to recover the catalyst material, ferrocene or its derivatives, from high burn rate propellants comprises the method which uses compressed gas in the form of a near critical liquid to extract, remove, and recover the specific catalyst material directly from rocket motors or from chunks of cut propellant.

The method comprises introducing compressed carbon dioxide into a pressure vessel containing the propellant from which the catalyst material is to be recovered. The carbon dioxide as a near critical liquid (NCL) is circulated within the pressure vessel where extraction of ferrocene or its derivatives directly from the propellant takes place. The NCL with extractibles is transported to a warming and recovery zone where the extractibles are recovered after the carbon dioxide is volatilized and returned for recycling, compressing, and further extracting after being adjusted to a near critical liquid.

Analytical data indicates that from 99.8% to 100% of ferrocence or its derivatives is readily recoverable from propellant which is undergoing demilitarization after it is determined to have burning rate, sensitivity, or other measureable changes to be out of system specification. After recovery of the high dollar value catalyst material, the propellant can be safely handled for removal using conventional water jet apparatus to cut and remove the propellant for reclamation of any of the propellant ingredients.

4 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEMILITARIZATION OF HIGH BURN RATE PROPELLANTS CONTAINING FERROCENE OR ITS DERIVATIVES

DEDICATORY CLAUSE

The invention described herein may be manufactured, used, and licensed by or for the Government for governmental purposes without the payment to us of any royalties thereon.

BACKGROUND OF THE INVENTION

Solid rocket motors containing high burning rate ammonium perchlorate based composite solid propellants are required to be monitored to ascertain whether changes after manufacture result in the burning rate of the propellant, sensitivity, or other measureable changes to be out of system specification. The handling, transfer, and the required demilitarization, when the propellant does not meet the usefulness for which it was intended, can be extremely hazardous.

The following discussions relate to high burning rate ammonium perchlorate based composite solid propellants, particularly those propellants which use the ferrocene or the more expensive ferrocene derivative, liquid Catocene, the registered trademark for Syntex Chemicals, Inc. 2,2-bis(ethylferrocenyl)propane ($C_{27}H_{32}Fe_2$). Of particular concern prior to the conception and reduction of practice of the invention disclosed hereinbelow is the lack of a suitable method to perform demilitarizations on rocket motors which have been determined to be out of system specification. Thus, demilitarization refers to the removing and destroying of the obsolete propellant since no satisfactory recovery method for the expensive propellant ingredients is available.

High burning rate ammonium perchlorate based composite solid propellants, such as in the Nike Zeus, utilize finely powered ferrocene (or dicyclopentadienyl iron) to achieve the desired burn rate augmentation. One of the main disadvantages of utilizing ferrocene in these propellants is its tendency to increase propellant sensitivities toward impact, friction, electrostatic and thermal degradation. Even though ferrocene possesses a melting point in the 174°–176° C. temperature range, it has a high vapor pressure and behaves like a volatile material. Because of this, it has a strong tendency to sublime during temperature cycling and recrystallize on the surface of the propellant grain. Continuing deposition of ferrocene on the grain surface will ultimately cause the burning rate of the propellant to be out of system specification. Additional concern comes from the realization that increased concentrations of ferrocene at the propellant surface can result in significant increases in propellant sensitivities. For example, a low percentage of ferrocene in the bulk propellant (e.g., 1–2%) may result in a much greater percentage ultimately recrystallized on the exposed propellant grain. If conditions are not monitored closely, this process can make the handling, transfer, and required demilitarization extremely hazardous. When such hazardous situations occur, demilitarization is accomplished by controlled burning and destruction of the motor. Alternatively, the propellant grain can be removed by using a water jet apparatus to cut and destroy the propellant. Neither of these methods allow for recovery and reclamation of any of the propellant ingredients.

Other high burn rate ammonium perchlorate based composite propellants often rely on the use of iron-containing burn rate catalysts, including ferrocenyl derivatives, as a catalyst ingredient to achieve the desired burn rate augmentation. Liquid Catocene is an example of such an ingredient that has received considerable attention and use by the propellant industry over the years. In addition to being an effective burn rate catalyst, Catocene also serves as a plasticizer in these propellants since it remains a liquid over the temperature storage and cycling regimes required of these missile systems. Its dual function gives Catocene a decided advantage over solid burn rate catalysts, such as ferrocene and iron oxide. Catocene's plasticizing abilities permit high oxidizer loadings to be achieved than would otherwise be possible. However, the major disadvantage of Catocene is its tendency to increase propellant sensitivities toward impact, friction, electrostatic discharge and thermal degradation. Several instances of accidental fires, injuries, and deaths have occurred with Catocene containing propellants. Catocene has been identified as the ingredient primarily responsible for increasing the hazards associated with these propellants. It is also an expensive ingredient costing $250 to $600 per pound depending on supplier and quantity. The recovery of Catocene during the demilitarization process would be beneficial. Because of the nature of Catocene and ferrocene-containing propellants and lack of suitable chemical recovery technology, demilitarization is usually accomplished by controlled burning and destruction of the motor hardware. Alternatively, the propellant grain containing ferrocene or a ferrocene derivative can be removed from the motor by using a water jet apparatus to cut and destroy the propellant. Likewise, as previously stated, neither of these two methods allow for the safe recovery and reclamation of the rocket motor hardware or any of the propellant ingredients, particularly, the recovery of waste chemicals in accordance with present and projected Environmental Protection Agency requirements.

The desirability of a method for demilitarization of high burning rate ammonium perchlorate based composite solid propellants, which efficiently recovers ingredients such as ferrocene and its derivatives, is well recognized by artisans in the solid propellant field.

Therefore an object of this invention is to provide a method for recovering ferrocene and its derivatives from solid propellant compositions.

SUMMARY OF THE INVENTION

Compressed gas in the form of a critical fluid is employed to extract, remove, and recover ferrocene and its derivatives directly from rocket motors or from cut propellant waste.

The method of this invention employs a modified high pressure (e.g. Soxhlet-type) extractor. The method uses compressed carbon dioxide gas, as a near critical liquid (NCL).

The modified high pressure extractor as employed with the method conditions set forth herein efficiently removes the ferrocene and its derivatives from the propellant grain to permit the remainder of the propellant to be more safely handled during propellant removal by conventional means to thereby permit recovery of expensive rocket motor hardware and the ferrocene and its derivatives. The efficiency of removal is 99.8% of the known percent of powdered ferrocene contained in a rocket motor propellant. The data for Catocene recovery by the same conditions reveals that 100% of Catocene is readily recovered from rocket motor propellant.

BRIEF DECRIPTION OF THE DRAWINGS

DESCRIPTION OF THE PREFERRED EMBODIMENT

The recovery of ferrocene or its deriatives from a solid propellant composition is achieved by the method which employs compressed gas in the form of a near critical fluid. Extraction of ferrocene or its derivatives by the method of this invention for demilitarization of high burn rate propellants containing ferrocene or its derivatives renders the propellant safer for handling whereby the non-extractible ingredients (e.g., cross-linked polymer, solid oxidizer, and other non-volatile solid propellant additivies) can then be removed by conventional means.

The extraction method of this invention is adaptable for recovery of ferrocene or its derivatives from propellant, either in a rocket motor or out of rocket motor. However, since the preferred method of recovery is from propellant in the rocket motor, this preferred embodiment of the method is described first. In either situation, a pressure vessel is required wherein compressed $CO_2$ gas is employed as a near critical liquid (NCL). A laboratory near critical liquid extractor is employed which is a modified high pressure Soxhlet-type extractor.

Figure 1:
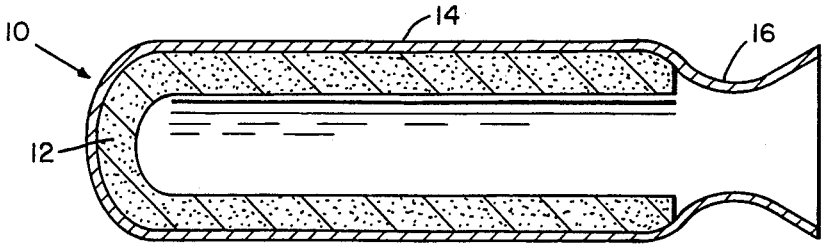
FIG. 1 illustrates a loaded rocket motor whose rocket motor case serves as its own pressure vessel.

In further reference to the drawing, FIG. 1 depicts a rocket motor containing a high burning rate ammonium perchlorate based composite propellant 12 containing ferrocene or its derivative, such as Catocene, as the burning rate catalyst to be extracted.

The rocket motor 10 includes case 14 with an attached nozzle 16. The rocket motor serves as its own pressure vessel when extraction is achieved by a near critical liquid (NCL) extractor.

Figure 2:
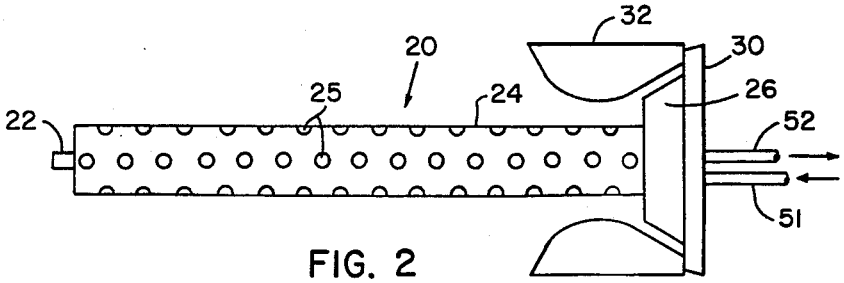
FIG. 2 illustrates a near critical liquid extractor.

FIG. 2 depicts a near critical liquid (NCL) extractor 20 designed for insertion into the rocket motor 10 through nozzle 16. The NCL extractor 20 comprises an inner tube member 22 extending through a predetermined length of a multi-perforated outer tube member 24 with multi-perforations 25. The predetermined length is based on the distance from the pressure sealing member 26 to a point just short of the propellant perforated grain surface. Plumbing connections 51 and 52 are shown in communication with the inner tube member 22 and outer tube member 24, respectively, through flange 30 which secures inner tube member 22 and outer tube member 24 in a fixed relationship. Flange 30 is provided with locking devices 32 so that when said members are slipped into rocket motor, locking the NCL extractor to the rocket motor is thereby achieved by locking onto the rocket nozzle.

A similar plumbing connection provides a return of the perforated outer tube to a recovery unit outside the rocket motor.

Figure 3:
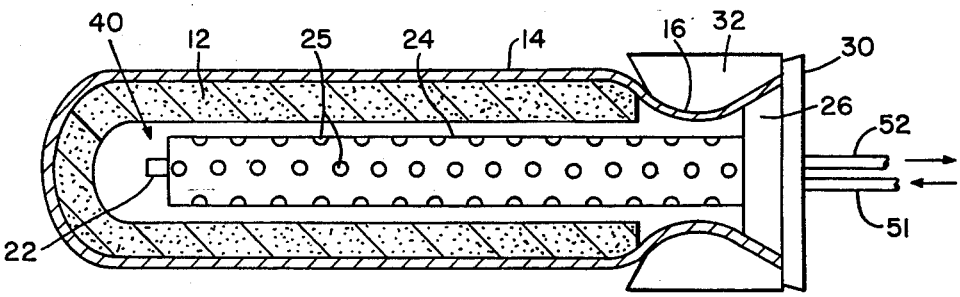
FIG. 3 illustrates a near critical liquid (NCL) extractor in a rocket motor case.

FIG. 3 illustrates an in-case-mounted NCL extractor where like numbers are shown for like parts illustrated in preceeding FIGS. 1 and 2.

Figure 4:
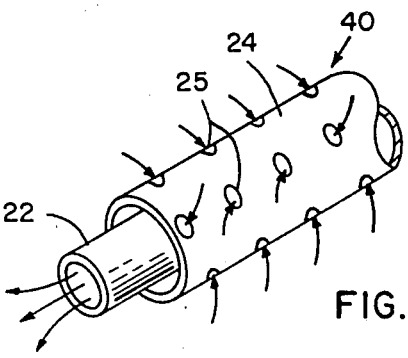
FIG. 4 illustrates an enlarged view of the NCL extractor of FIG. 3 to show NCL directional flow in and flow out when in service.

FIG. 4 illustrates a section of the outer and inner tubes of NCL extractor. The designation 40 in FIG. 3 is shown in FIG. 4 in enlarged view to illustrate the flow direction (in and out) from inner tube member and outer tube member, respectively.

A laboratory extractor in operation thus supplies incoming compressed $CO_2$ gas, under sufficient pressure and temperature to perform as a near critical fluid to penetrate into the propellant, which acts as the solvating agent for leaching or extracting ferrocene or its derivatives from the propellant grain. The soluble ferrocene or its derivatives are thereby dissolved in the circulating NCL fluid which is returned to the outside of the rocket motor by way of perforated outer tube member. The arrows indicated in FIG. 4 show the flow pattern from the inner tube and return into the outer tube member by way of the plurality of perforations.

A completed cycle of operation includes introducing compressed $CO_2$ gas which is circulated as a NCL and penetrates the propellant grain, extracts the ferrocene or its derivatives and exits the motor through the perforations of the outer tube member. The liquid $CO_2$ containing the ferrocene or its derivatives is returned to the warming zone and/or expansion chamber and recovery unit where the liquid $CO_2$ is converted to a gas and recycled. Ferrocene or its derivative are recovered in the expansion chamber as a solid or liquid since they are not soluble in gaseous $CO_2$.

Figure 5:
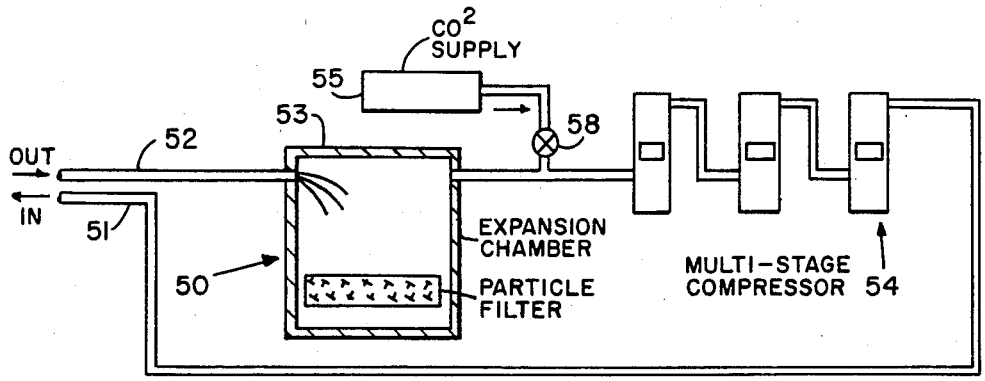
FIG. 5 depicts an expansion and recovery system which is adaptable for use with the near critical liquid extractor of FIG. 2.

FIG. 5 depicts an expansion and recovery system 50 having in tube member 51 for connecting to inner tube member 22 and an outer tube member 52 for connecting to outer tube member 24 and returning the NCL and extractibles to expansion chamber 53 where $CO_2$ "gas out" is returned to a multi-stage compressor 54 for recycling. $CO_2$ supply 55 or make-up $CO_2$ is shown for charging system through valve 58.

Figure 6:
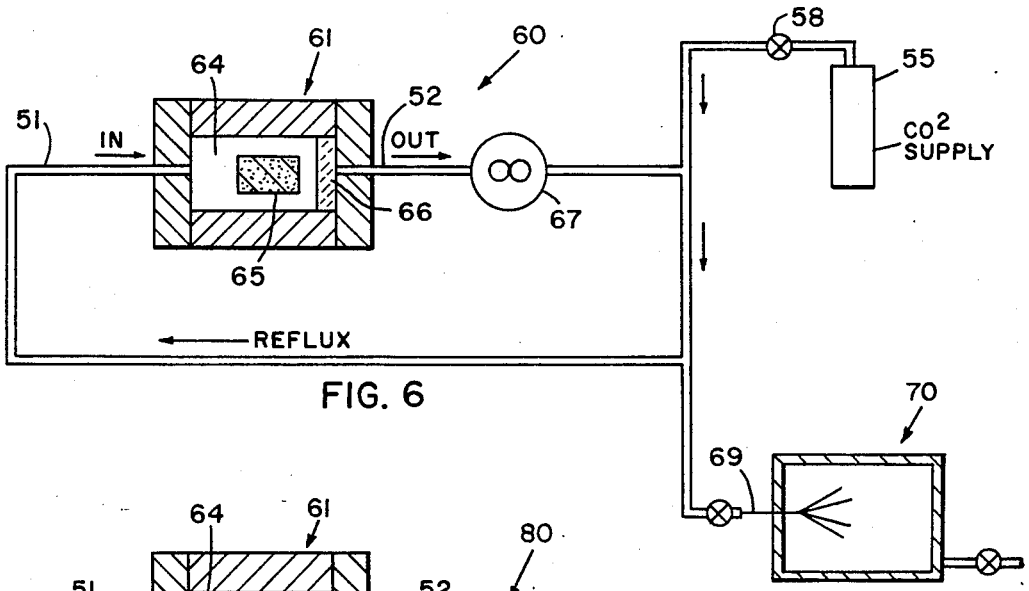
FIG. 6 illustrates basic extraction equipment.
Figure 7:
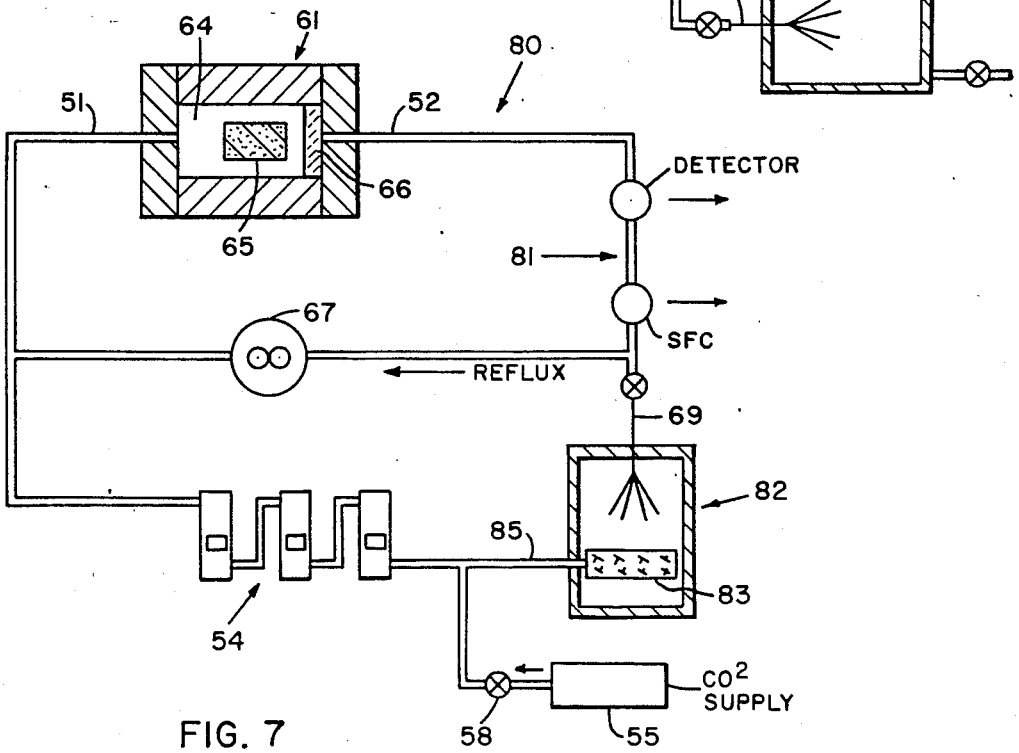
FIG. 7 illustrates complete extraction equipment.

FIGS. 6 and 7 depicts a basic extraction equipment 60 and a complete extraction equipment 80. Extractor equipment 60 includes an extractor cell 61 having inlet and outlet connections 51 and 52 and a chamber 64 containing propellant 65. A rocket motor case with propellant therein, as illustrated in FIG. 3, can be installed in place of extractor cells 61 of FIGS. 6 and 7 for use with extraction equipment 60 and 80 respectively. A frit filter 66 is shown positioned within chamber 64 to trap solids which might restrict out line 63. A gear pump 67 (magnetically coupled) is positioned in out line to exert pressure for reflux operation as illustrated. $CO_2$ source 55 for supplying pure $CO_2$ through valve 58 is shown. When recovering extractibles, the NCL and extractibles are passed through restrictor 69 into a sample collection chamber 70 where NCL undergoes phase change to $CO_2$ gas which results in releasing extractibles (ferrocene or its derivatives) for recovery.

FIG. 7 depicts complete extraction equipment 80 which illustrates components and parts wherein like components and parts are identified with like numeral designations as shown in FIG. 6. FIG. 7 further illustrates an analyses system 81 for monitoring progress of extraction as shown. Examples of analysis systems shown include UV absorbance detector and super critical fluid chromatography system (SFC). The sample collection chamber of FIG. 6 is modified as shown for the rapid expansion and sample collection chamber 82 which includes within the chamber a particle filter 83 thereby permitting separation of ferrocene particles from its liquid derivatives by retaining the solid ferrocene or its solid derivatives above the particle filter and allowing any liquid extractible or liquid ferrocene derivastive to pass through the particle filter to bottom of sample collection chamber. Make-up or $CO_2$ initial charging is admitted through valve 58 while recycled $CO_2$ is passed through common supply and recycle line 85 to a multi-stage compressor 54 for compressing $CO_2$ to desired pressure for extraction equipment.

The method of this invention is based on the use of compressed gas in the form of a critical fluid to extract, remove, and recover volatile solid propellant ingredients from rocket motors under acceptable temperature and pressure conditions. Specifically, with the use of compressed carbon dioxide gas, as the near critical liquid (NCL), the selective extraction and recovery of solid and liquid ferrocenes from propellant grains are readily accomplished as explained hereinabove.

Table I sets forth data which indicates that ferrocene is substantially a 100% extractible solid when using NCL carbon dioxide as shown.

TABLE I

NCL Extraction of Ferrocene by Carbon Dioxide

| Initial Weight | Form | $CO_2$ Pressure | Processing Temperature | % Ferrocene Extracted and Recovered |
|---|---|---|---|---|
| 438 mg. | Powder | 760 Psig | 31° C. | 99.8% |

Table II sets forth data for Catocene extraction from a composite propellant consisting of ammonium perchlorate, aluminum, crosslinked hydrocarbon binder, and Catocene. This data indicates 100% extraction of Catocene.

TABLE II

NCL Carbon Dioxide Extraction of Catocene From a Composite Propellant

| Weight of Propellant | Weight of Extract | Weight Percent Extracted | Actual Weight Percent Catocene in Propellant |
|---|---|---|---|
| 537 mg | 26 mg | 4.8% | 4.8% |

The experimental laboratory conditions of the NCL exraction process required for the extractions of Table I and II are as follows:

Propellant temperature, 31° C.; cold finger temperature 5° C.; chamber pressure, 760 psig $CO_2$; extraction time, 45 minutes; and $CO_2$ bleed off time, 1 hour.

The percent recovery of ferrocene is determined by quantitative weight determinations. The capillary gas chromatographic techniques also is employed as an accurate means to identify and quantitatively determine the presence of ferrocene in extractible mixtures.

The percent Catocene in the propellant is obtained by using standard capillary gas chromotography methods.

The economic value of the recovered ferrocene, Catocene, or its liquid derivatives is quite significant for very large rocket motors; however, the disclosed method is advantageous regardless of the economic value of products recovered since removal of the hazardous catalysts materials is a requirement for safety in handling and disposal of the propellant requiring demilitarization as further discussed below.

Once the ferrocene, Catocene or any of their volatile solid or liquid derivatives have been extracted from the propellant grain of the rocket motor, the remainder of the non-extractible ingredients (e.g., cross-linked polymer, solid oxidizer, and other non-volatile solid propellant addivities) can then be removed by conventional means.

The use of the NCL technique described herein has direct application to the recovery of expensive rocket motor hardware during the production line casting of propellants containing Catocene or any of its volatile or liquid derivatives. For example, in the event that propellant voids, grain cracks, burn rate variances, or other such system requirements are found to be out of specification, the propellant can be made less hazardous by the extraction of Catocene. NCL extraction of Catocene would thus permit the remainder of the propellant to be more safely handled and treated in accordance with standard operating procedures.

The process of this invention is adaptable for extracting ferrocene or its volatile derivatives from recycled propellant by placing chunks of propellant in a vessel which can be pressurized and which is adapted for receiving a near critical liquid extractor having an inner and outer tube for controlling the flow in and out of the vessel while preferentially extracting the ferrocene or its derivatives from the chunks of propellant.

We claim:

1. A method for extracting, removing, and recovering ferrocene or its derivatives from a solid propellant composition comprised of ammonium perchlorate, aluminum, crosslinked hydrocarbon binder, and said ferrocene or its derivatives, said method comprising:

i. introducing compressed carbon dioxide gas at a predetermined pressure and temperature which results in said compressed carbon dioxide being in a near critical liquid state into a pressure vessel containing cooled solid propellant composition having ferrocene or its derivatives as a dispersed ingredient that is extractible by said near critical liquid, said pressure vessel having an inlet means for introducing said near critical liquid and said pressure vessel having an outlet means having a plurality of perforations for discharging the near critical liquid and extractibles from said pressure vessel;

ii. providing an extraction time to achieve extraction of ferrocene or its derivatives from said propellant composition;

iii. providing an extended extraction time to achieve maximum extraction by circulating within said pressure vessel said near critical fluid containing ferrocene or its derivatives as extractibles;

iv. removing said near critical liquid containing said extractibles to a collection chamber;

v. effecting pressure change and temperature change of said near critical liquid containing said extractibles to achieve a phase change and subsequent evaporation of carbon dioxide to a gas to thereby achieve a separation of said extractibles;

vi recycling said carbon dioxide gas through a compressor for compressing to a compressed gas; and, vii. recovering said extractibles which include ferrocene or its derivatives.

2. The method of claim 1 wherein said predetermined pressure of said compressed carbon dioxide is about 760 psig, and said propellant is about 31° C.

3. The method of claim 2 wherein 99.8% of ferrocene is recovered from said propellant composition, and wherein said pressure vessel is a rocket motor.

4. The method of claim 2 wherein said ferrocene derivative is 2,2-bis(ethylferrocenyl)propane, said pressure vessel is a rocket motor, and wherein 100% of said 2,2-bis(ethylferrocenyl)propane is recovered from said propellant composition.

* * * * *